Figure 5:
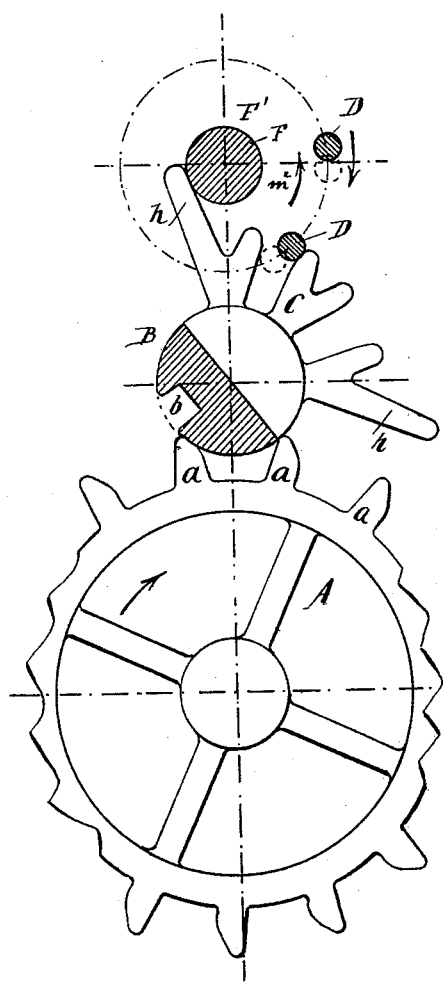

(No Model.)  A. KAISER.  9 Sheets—Sheet 1.
TIME PIECE ESCAPEMENT.
No. 409,150.  Patented Aug. 13, 1889.
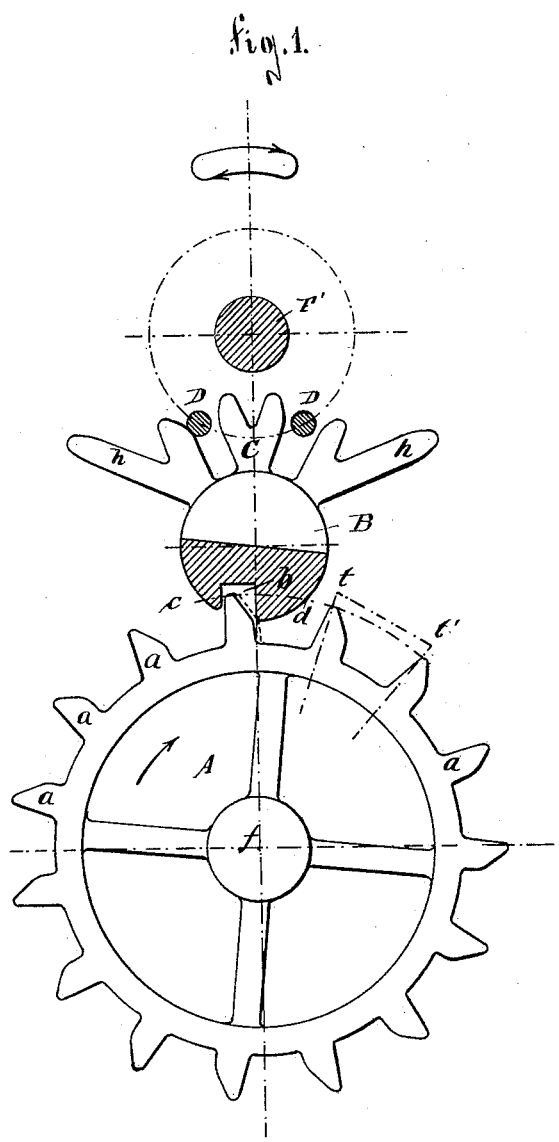
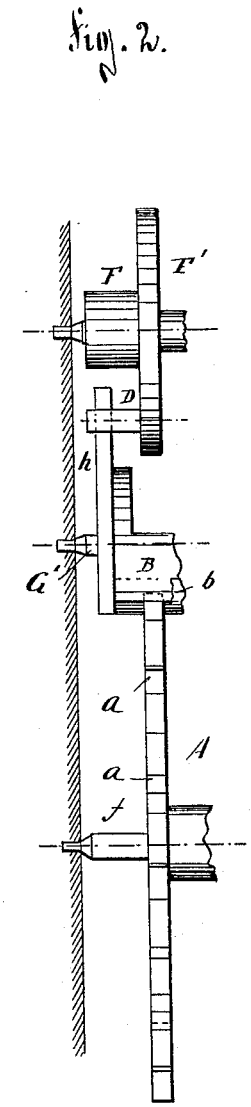
WITNESSES:
INVENTOR,
Alexander Kaiser
BY Goepel & Raegener
ATTORNEYS.

(No Model.)  9 Sheets—Sheet 2.
A. KAISER.
TIME PIECE ESCAPEMENT.
No. 409,150. Patented Aug. 13, 1889.
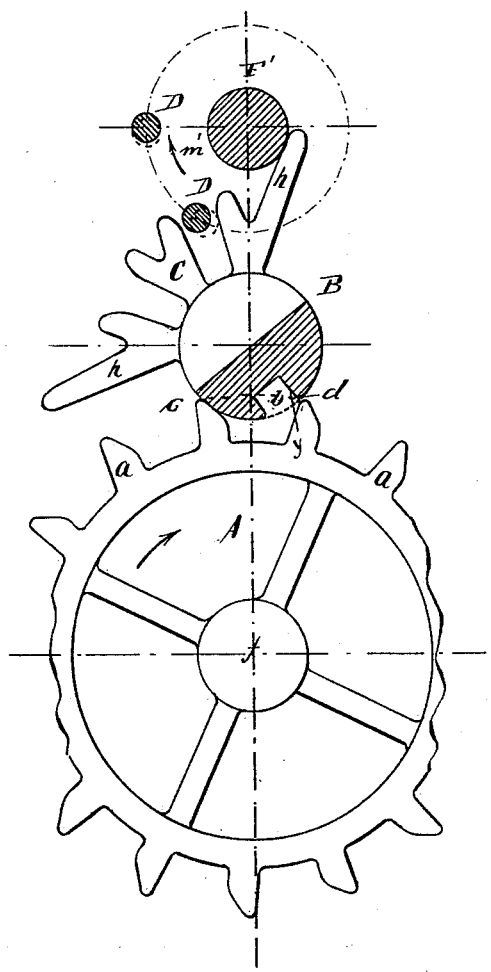
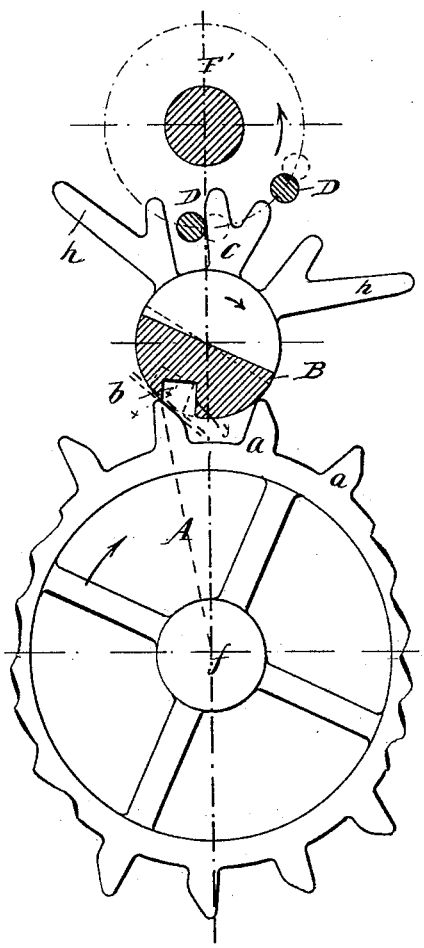
WITNESSES:
INVENTOR
Alexander Kaiser
BY
ATTORNEYS (No Model.) 9 Sheets—Sheet 3.

A. KAISER.
TIME PIECE ESCAPEMENT.

No. 409,150. Patented Aug. 13, 1889.

WITNESSES:
Henry Huber
Carl Kurz

INVENTOR
Alexander Kaiser
BY Goepel & Raegener
ATTORNEYS (No Model.)
9 Sheets—Sheet 4.
A. KAISER.
TIME PIECE ESCAPEMENT.
No. 409,150. Patented Aug. 13, 1889.
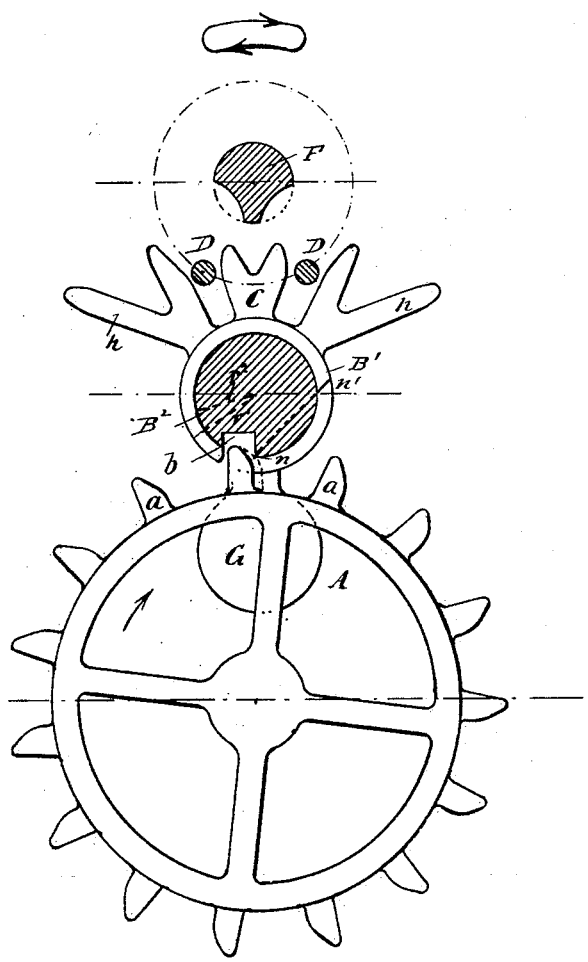
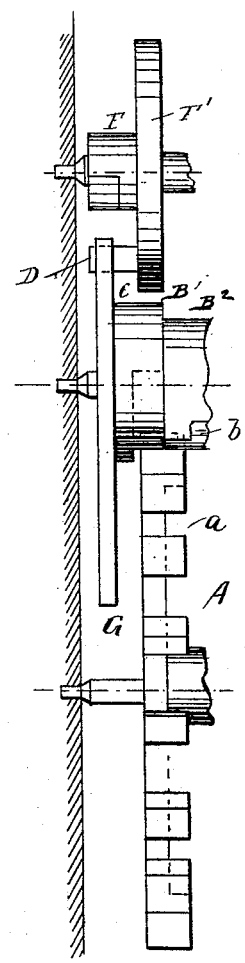
WITNESSES:
INVENTOR
Alexander Kaiser
BY
ATTORNEYS.

(No Model.) 9 Sheets—Sheet 5.
A. KAISER.
TIME PIECE ESCAPEMENT.

No. 409,150. Patented Aug. 13, 1889.

WITNESSES:
Henry Huber
Carl Kurz

INVENTOR
Alexander Kaiser
BY Goepel & Raegener
ATTORNEYS.

(No Model.) 9 Sheets—Sheet 6.
A. KAISER.
TIME PIECE ESCAPEMENT.

No. 409,150. Patented Aug. 13, 1889.

WITNESSES:
Henry Huber
Carl Kaiser

INVENTOR
Alexander Kaiser
BY Goepel & Raegener
ATTORNEYS (No Model.)  
9 Sheets—Sheet 7.
A. KAISER.
TIME PIECE ESCAPEMENT.
No. 409,150.  
Patented Aug. 13, 1889.
Fig. 13.
Fig. 14.
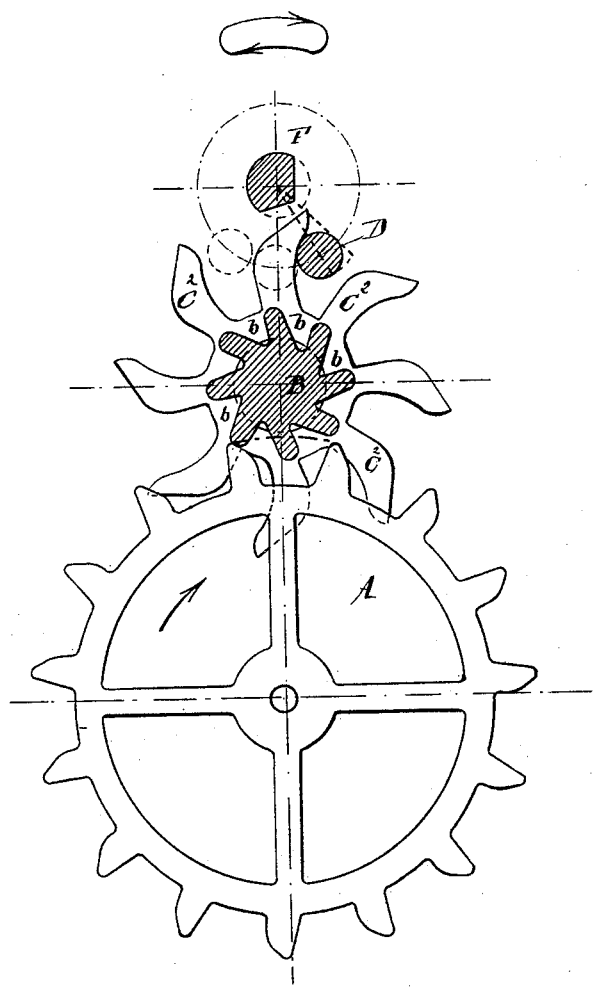
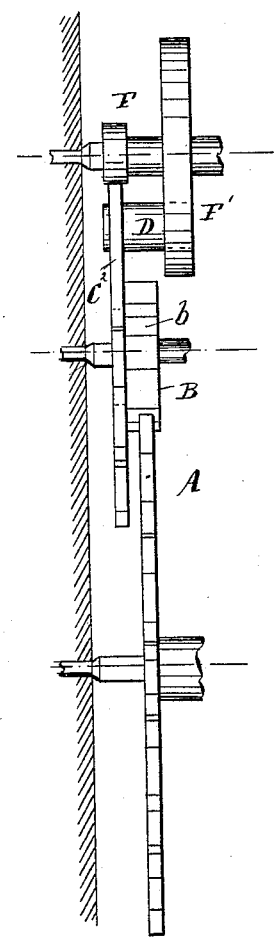
WITNESSES:  
Henry Huber  
Carl Kay
INVENTOR  
Alexander Kaiser  
BY Goepel & Raegener  
ATTORNEYS.

(No Model.)
9 Sheets—Sheet 8.
A. KAISER.
TIME PIECE ESCAPEMENT.
No. 409,150.  Patented Aug. 13, 1889.
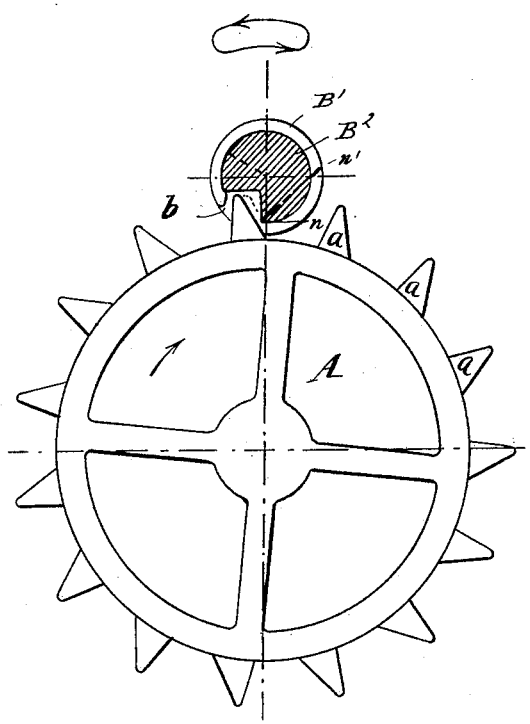
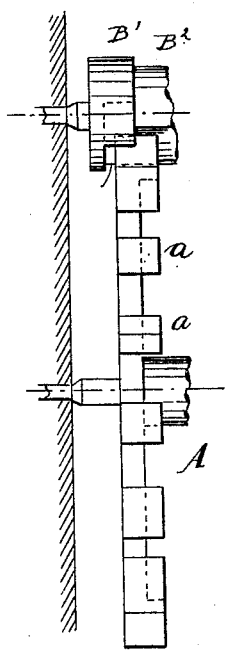
WITNESSES:
INVENTOR
Alexander Kaiser
BY
Goepel & Raegener
ATTORNEYS.

(No Model.) 9 Sheets—Sheet 9.
A. KAISER.
TIME PIECE ESCAPEMENT.
No. 409,150. Patented Aug. 13, 1889.
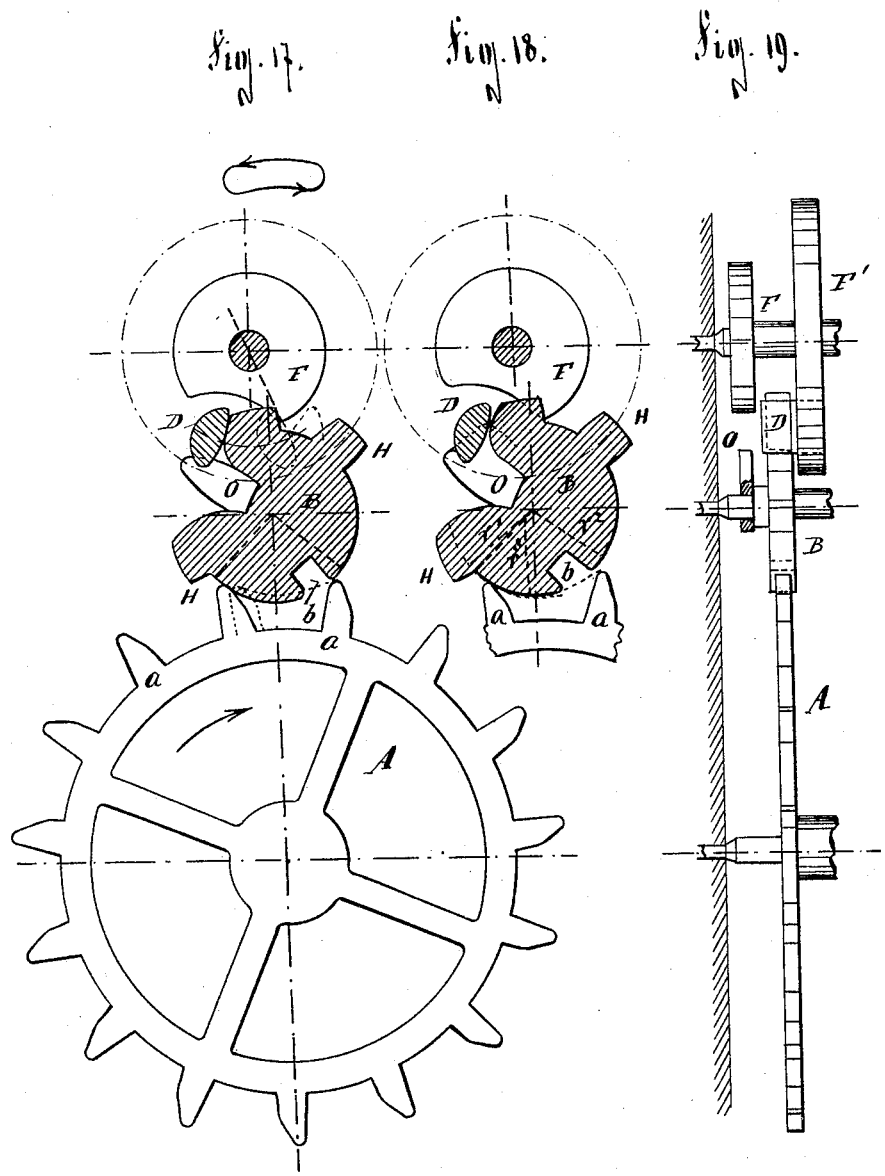
WITNESSES:
INVENTOR
Alexander Kaiser
BY
ATTORNEYS.

UNITED STATES PATENT OFFICE.

ALEXANDER KAISER, OF BERLIN, GERMANY, ASSIGNOR TO LUDWIG MARCKWALD, OF SAME PLACE.

TIME-PIECE ESCAPEMENT.

SPECIFICATION forming part of Letters Patent No. 409,150, dated August 13, 1889.

Application filed October 9, 1888. Serial No. 287,651. (No model.) Patented in Germany May 19, 1888, No. 46,989; in France August 7, 1888, No. 192,294; in Belgium September 12, 1888, No. 83,243, and in Switzerland November 21, 1888, No. 175.

*To all whom it may concern:*

Be it known that I, ALEXANDER KAISER, a citizen of Switzerland, and a resident of Berlin, German Empire, have invented certain new and useful Improvements in Escapements for Watch, Clock, and Similar Apparatus, (for which Letters Patent were granted to me in Germany, No. 46,989, May 19, 1888; in France, No. 192,294, August 7, 1888; in Belgium, No. 83,243, September 12, 1888, and in Switzerland, No. 175, November 21, 1888,) of which the following is a specification.

This invention relates to improvements in escapements for clocks and watches; and the object of my invention is to provide a new and improved escapement which is simple in construction and operation and permits of the use of heavier pendulums or balance-wheels, and which escapement is not affected by the jars and vibrations, thus causing a more regular and uniform operation of the works of watches and clocks.

The invention consists in the construction and combination of parts and details, as will be fully described and set forth hereinafter, and finally pointed out in the claims.

In the accompanying drawings, Figure 1 is a face view of my improved escapement, parts being in section. Fig. 2 is a side view of the same, parts being broken out and others in section. Figs. 3, 4, 5, and 6 are elevations, partly in section, showing the different positions of the several parts, some parts being broken out. Fig. 7 is an elevation of a modified construction of my improved escapement, parts being in section. Fig. 8 is a side view of the same, parts being broken out and others in section. Figs. 9, 10, 11, and 12 are elevations, partly in section, of the construction shown in Fig. 7, parts being broken out and several parts of the escapement having different positions. Fig. 13 is an elevation of another modification of my improved escapement, parts being in section. Fig. 14 is a side view of the same, parts being broken out and others in section. Fig. 15 is an elevation of my improved escapement, showing another modification, parts being in section. Fig. 16 is a side view of the construction shown in Fig. 15, parts being in section and others broken out. Fig. 17 is an elevation of my improved escapement, showing another modification, parts being in section. Fig. 18 is a similar view showing the parts in different positions. Fig. 19 is a side view of the construction shown in Figs. 17 and 18, parts being in section and others broken out.

Similar letters of reference indicate corresponding parts.

Referring to the construction shown in Figs. 1 to 6, A represents the escapement-wheel, having the arbor $f$ suitably mounted, which escapement-wheel is provided with a series of teeth $a$, having their free ends beveled at one side, as shown. The escapement-cylinder B is provided with a suitable arbor G', and has a notch $b$, into which the teeth $a$ of the escapement-wheel A can enter such a distance that the chord of the arc $c\,d$ will be equal to the distance $t\,t'$ from which the teeth $a\,a$ are separated. The line $c\,d$ is an arc the center of which is at the center of the pinion of the escapement-wheel, the radius of which arc is equal to the distance from the center of the arbor $f$ to the outer ends of the teeth $a$, and the said length $c\,d$ is equal to the distance traversed by said arc within the escapement-cylinder B.

The cylinder B is provided with the double fork C, having the two extensions or arms $h$. The balance-wheel F' has a hub F, and is provided with two pins D D, that can engage the shanks or prongs of the double fork C in the manner that will now be described.

If the parts are in the position shown in Fig. 1 at the time that the motive power is not active, then as soon as the motive power begins to act that tooth $a$ of the balance-wheel A which at the time is in the notch $b$ of the cylinder B will act acceleratively on the escapement-cylinder until the parts have the positions shown in Fig. 3. The double fork C transmits this accelerating action directly upon pins D D of the balance-wheel. The following tooth $a$ of the balance-wheel now rests against the cylinder, as shown in Fig. 3, and the balance-wheel can complete its movement toward the left—that is, in the direction in which the hands turn, as indicated by the arrow $m$, Fig. 3. Upon the return movement of the balance-wheel the pins D D, when in the dotted position shown in Fig. 3, act on one of the prongs of the double fork and bring the same and the cylinder into the position shown in Fig. 5, and then the balance-wheel completes its stroke toward the right, as indicated by the arrow $m^2$, Fig. 5. While passing from the position shown in Fig. 3 into the position shown in Fig. 5 the parts assume the very important position shown in Fig. 4.

At the moment that the escapement-cylinder assumes the position shown in Fig. 4 the escapement-wheel is released and the cylinder has still almost its greatest speed, whereas the escapement-wheel has still to overcome its inertia. In order to attain the position shown in dotted lines in Fig. 4, a slight back impact $x\,x'$ need be overcome, which impact is reduced materially by beveling the teeth. If desired, an elastic or spring contrivance may be provided in one of the wheels of the train to reduce the force of this back impact. When after the parts have been in the position shown in Fig. 5 and the balance has completed its movement toward the right and returns, the pins D D are in the positions shown in dotted lines in Fig. 5 and again act on the prongs or shanks of the double fork C and bring the balance-wheel into the position shown in Fig. 6. The escapement-wheel now acts on the cylinder and the above-described operation is repeated.

Figure 6:
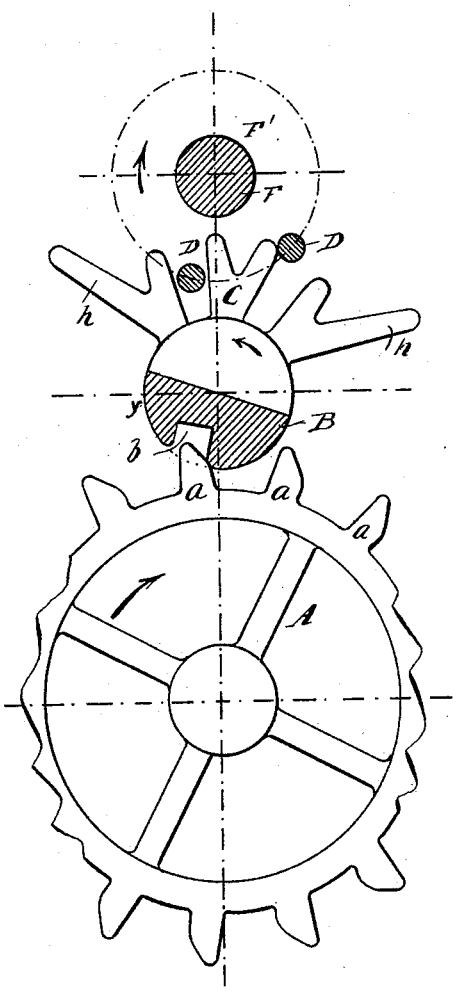
Figure 9:
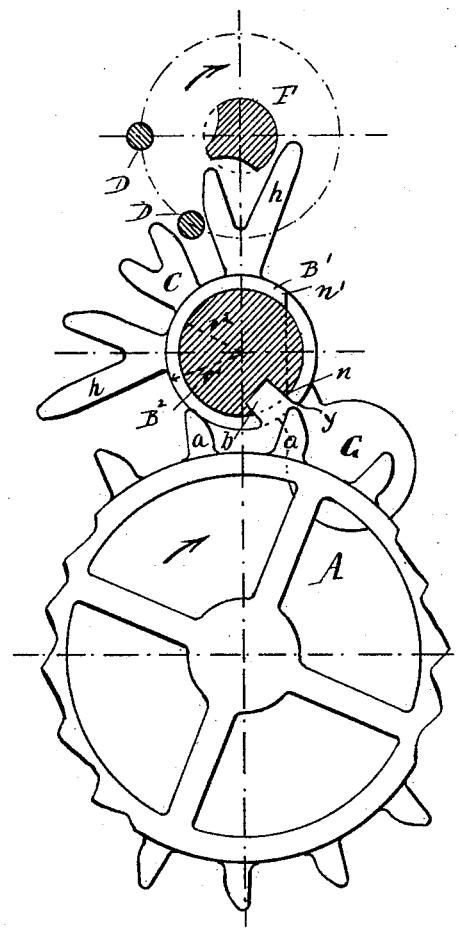

During the time that the parts pass from the position shown in Fig. 5 to the position shown in Fig. 6 the edge $y$ of the cylinder travels a much greater distance than the tooth $a$ of the escapement-wheel, in consequence of which said tooth immediately follows the edge $y$, thus acting acceleratively on the cylinder. For the purpose of holding the cylinder in a state of rest the arms $h\,h$ are provided on the shanks of the double fork C, so that they rest against the hub F of the escapement-wheel F', as shown in Figs. 3 and 5.

In the construction shown in Figs. 7, 8, 9, 10, 11, and 12 the movements of the parts are the same as described in relation to Figs. 1 to 6. In order to avoid the back impact, the escapement-cylinder is made of two concentric sections B' B², of different radii. The cylinder is made solid and has a weighted arm G for the purpose of balancing it. In the construction shown in Figs. 1 to 6 half the cylinder is cut away for the purpose of balancing it.

Figure 10:
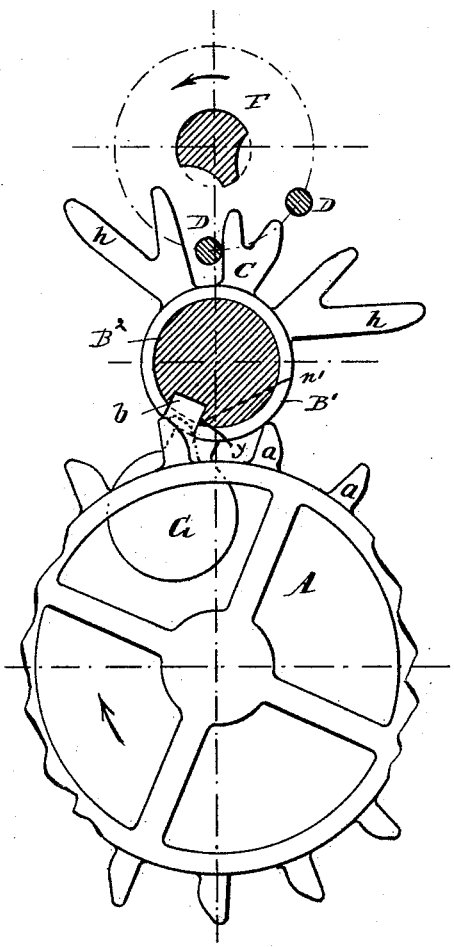
Figure 11:
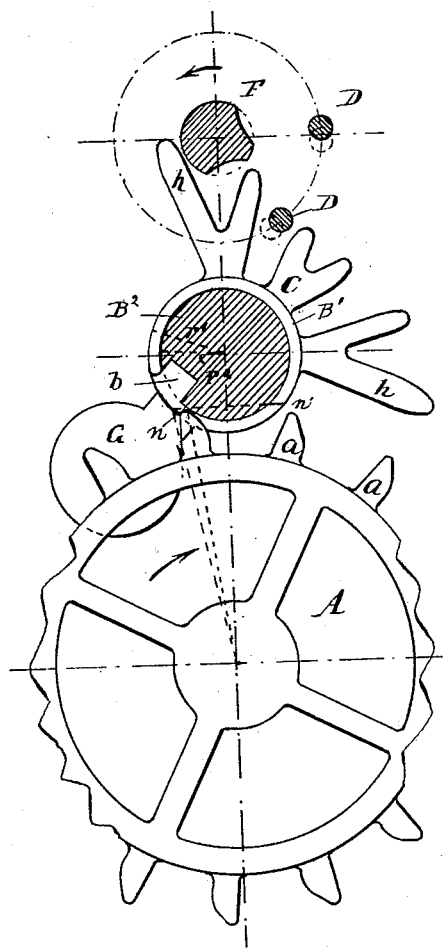
Figure 12:
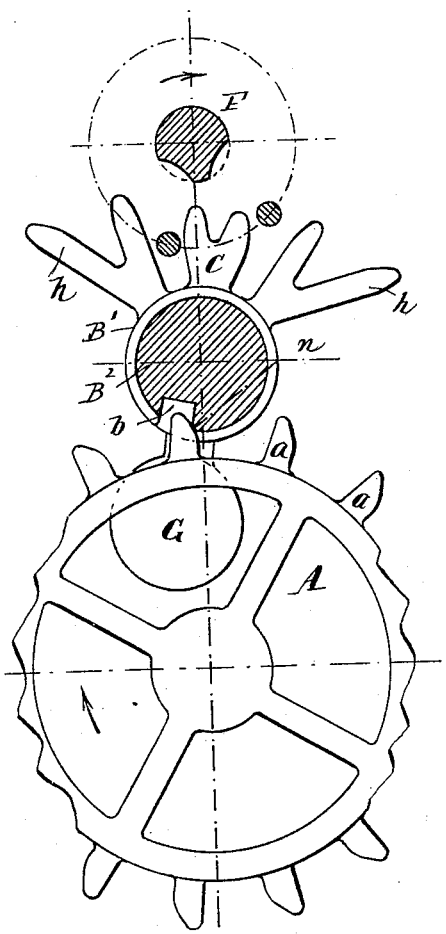

From the positions shown in Figs. 7, 9, 10, 11, and 12 it will be seen that if the difference between the two radii $r'\,r^2$ is equal to or slightly greater than the distance $x\,x'$ which the escapement-wheel can advance during the time that the edge $y$ of the notch $b$ passes from the position shown in Fig. 10 to the position shown in Fig. 11 no back impact can occur. The following tooth $a$ simply slides off the face of the cylinder B' and upon the edge of the notch in the cylinder B². As normal positions of the balance-wheel, the positions in Fig. 1 or Fig. 6 can be taken, so that when the power is applied acceleration takes place at once.

If, in Fig. 1, an additional notch $b$ is provided within the space $c\,d$, then the return-stroke of the cylinder can be reduced one-half without reducing the accelerating action of the escapement-wheel on the same, and it thus follows that by properly distributing the notches $b$ throughout the entire circumference of the cylinder and by correspondingly arranging a number of arms $C^2$ a rotative escapement can be produced, as shown in Figs. 13 and 14, which moves backward the distance of one subdivision and forward the distance of two. The curved arms $C^2$ hold the cylinder B when at rest, as said arms strike that part of the hub F of the escapement-wheel that is not recessed or cut out.

During the movement toward the right of the balance the pin D on the balance-wheel stops the cylinder after the same has been turned—that is, it holds the same until the following-tooth $a$ of the escapement-wheel rests against the surface of the cylinder. However, the device for holding the cylinder in proper place can be the same as shown in Fig. 2, or a separate safety-wheel can be provided. When the pin D moves toward the left, the releasing of the cylinder shown in Fig. 13 occurs with comparatively great speed, so that the tooth $a$ of the escapement-wheel follows the edge $y$ of the notch in the cylinder at once, and can thus act acceleratively upon said cylinder.

In the construction shown in Figs. 15 and 16 the cylinder B, composed of concentric cylindrical sections of different diameters, is fixed directly upon the axle of the balance-wheel. In Figs. 17, 18, and 19 the construction with the swinging cylinder is still more simplified. The double fork is reversed by two teeth C' C² and only a single pin D provided on the balance-wheel. The lugs H H, by coming in contact with the teeth $a$, limit the oscillatory movements of the escapement. The lug K, which can engage the hub F of the balance-wheel F', prevents displacement of the cylinder—that is, it prevents the same from assuming wrong positions. The friction on the surface of the cylinder can also be reduced by making the periphery of the cylinder more or less eccentric on the radius $r^3$, Fig. 18. In the construction shown in Fig. 17 the cylinder B can be made of a single piece with the axis or arbor G' by drawing a wire of the cross-section of the cylinder, cutting off proper lengths, and then turning off the end pivots.

My improved escapement has the following advantage over the anchor escapement:

The leverage of the main resistance to be overcome—namely, back impact and friction—is only one-half in my escapement of that which it is in the anchor escapement.

In my construction the transmission of power takes place by the engagement of the tooth of the escapement-wheel with the cylinder during almost the entire time that the escapement-wheel acts acceleratively, whereas in an anchor escapement it may happen that the tooth of the escapement-wheel only acts on a small part of the leverage-surface of the anchor-arm, whereby the time of the impulse or action, which at any rate is very small, is still more reduced.

Those surfaces on which the teeth rest in my improvement are cylindrical and have a circular movement whereby the construction is materially simplified, whereas in an anchor-escapement the surfaces must be beveled.

The releasing in my improved escapement does not occur as suddenly as in an anchor, and the teeth of the escapement-wheel can follow the edge $y$ of the notch in the cylinder at once and continuously act upon the same.

The advantageous utilization of the power for accelerating the balance-wheel or pendulum in my improved escapement permits the use of comparatively heavy balance-wheels or pendulums, and these are not as easily affected by jars and vibrations as light escapements and balances.

Having thus described my invention, I claim as new and desire to secure by Letters Patent—

1. In an escapement for watches and clocks, the combination, with an escapement-wheel, of a cylinder having a notch for receiving the teeth of the escapement-wheel, the double fork on the cylinder, a balance-wheel having one or more pins, and arms on said cylinder of such length that they can rest against the hub of the balance-wheel, substantially as set forth.

2. In an escapement for watches and clocks, the combination, with an escapement-wheel, of a cylinder having a notch for receiving the teeth of the escapement-wheel, a balance-wheel having one or more pins, projections on the cylinder, on which projections the pins on the balance-wheel can act, and projections on the cylinder, which projections can rest against the hub of the balance-wheel, substantially as set forth.

3. In an escapement for watches and clocks, the combination, with an escapement-wheel, of a cylinder formed of two concentric sections of different radii, each section having a notch, a balance-wheel, pins on said balance-wheel, and projections on the cylinder, on which projections the pins of the balance-wheel can act, substantially as set forth.

4. In an escapement for watches and clocks, the combination, with an escapement-wheel, of a cylinder composed of two concentric circular sections of different radii, each section having a notch, the notch of the larger section being larger than that of the smaller section, a balance-wheel having pins and projections on the cylinder, on which projections the said pins on the balance-wheel can act, substantially as set forth.

5. In an escapement for watches and clocks, the combination, with an escapement-wheel, of a cylinder having a notch for receiving the teeth of the escapement-wheel, a balance-wheel provided with a hub having parts cut away, pins on said balance-wheel, projections on the cylinder, on which projections the pins on the balance-wheel can act, and arms or projections on the cylinder, which arms or projections can come in contact with the hub of the balance-wheel, substantially as set forth.

In testimony that I claim the foregoing as my invention I have signed my name in presence of two subscribing witnesses.

ALEXANDER KAISER.

Witnesses:
B. ROI,
PAUL SOLOMON.